United States Patent [19]
McKay et al.

[11] 3,989,363
[45] Nov. 2, 1976

[54] CONTINUOUS FILM FEED APPARATUS

[76] Inventors: Hugh McKay, 2205 Beverly Glen Place; William Arthur Meyer, 2425 N. Beverly Glen Blvd., both of Los Angeles, Calif. 90024

[22] Filed: Mar. 3, 1975

[21] Appl. No.: 554,555

[52] U.S. Cl.................................. 352/109; 178/15
[51] Int. Cl.²......................................... G03B 41/10
[58] Field of Search .......... 352/109, 105, 106, 110, 352/120; 178/15, DIG. 28

[56] References Cited
UNITED STATES PATENTS

| | | | |
|---|---|---|---|
| 1,875,193 | 8/1932 | Ruhnau | 352/109 |
| 1,955,320 | 4/1934 | Batchelor | 178/DIG. 28 |
| 2,215,464 | 9/1940 | Dorgelo | 352/109 |
| 2,227,054 | 12/1940 | Bedford | 352/109 |
| 2,305,838 | 12/1942 | Beer | 352/109 |

*Primary Examiner*—Monroe H. Hayes

[57] ABSTRACT

An apparatus for moving film through a projection or camera system utilizing continuous, uninterrupted motion of the film. Conventional sprocketed film is moved from reel to reel at a constant velocity. The image of the film frame passing over the film projection gate is projected upon an oscillating mirror mechanism which is driven synchronously with the motive force for the film strip. The oscillating mirror pivots at an angular velocity which stabilizes the image of the film frame, the mirror returning to its initial position during a small interval of the total time the film frame passes over the projection gate. A shutter periodically interrupts the light passing through the film frame to allow the mirror to return to its initial position where it becomes synchronized with the succeeding frame image. Synchronization of mirror and frame is achieved by driving a shaft in alignment with the reflective mirror in a manner which will insure stabilization of the image as well as permitting the mirror to return to its initial state during the time in which the film frame passes over the projection gate.

9 Claims, 11 Drawing Figures

CONTINUOUS FILM FEED APPARATUS

BACKGROUND OF THE INVENTION

1. Field of the Invention

The present invention generally relates to motion picture projection and photographic apparatus and, more particularly, to projection apparatus in which a film strip is moving continuously through the projector or photographic equipment.

2. Prior Art

The prior art teaches a number of devices for producing a stationary projected image either on a screen or on photograpic film. The discussion of the present invention will be directed toward an embodiment for a projector, but it is clear to those having skill in the art that the present invention is equally applicable for editing and photographic devices. Some prior art devices provided reflecting means comprising semi-circular mirrors which are mounted for rotation and are tilted independently of each other by suitable cam members. Other prior art devices employ a plurality of mirrors arranged around a cylindrical drum which is rotated so that each successive image is reflected by each successive mirror. Examples of the above types of continuous film motion projectors are found in U.S. Pat. Nos. 2,506,198, 2,843,006, 2,770,163 and 3,067,284.

Improvements on the above-identified devices are found in related types of continuous film feed projection systems. In an improved continuous film feed device, images of the film frame and of a control aperture are projected on said mirror, the images being adjacent one another. The image of the control apertures is reflected from the mirror through a small aperture in an opaque shield and onto a photocell mounted behind the shield. The film frame moves continuously through the projection gate, the image of the control aperture moves progressively to illuminate a greater portion of the photocell. The photocell increases current to a galvanometer which pivots the mirror to counteract the movement of the film and thereby stabilizes the image on the screen. A shutter periodically interrupts the light to the photocell to allow the mirror to return to its initial position where it locks on to a succeeding frame image. In this device, the mirror shaft is integral with the galvanometer shaft so that variation in signal applied to the galvanometer will result in the rotational movement of the shaft. In operation, the incremental movement of the sprocket hole images causes the galvanometer shaft to rotate the mirror and thereby seek to track the film frame. The inadequacies of using a sensitive galvanometer are clear. Since movement of the film must be continuous, any variation in the current output of the photocell will result in an amplified variation in the output of the galvanometer. Since the tracking operation of the mirror is directly related to the operation of the galvanometer, the over-sensitive relationship between the two will result in poor synchronization between the rotation of the mirror and the continuous film movement.

In another device disclosed by the prior art, a perforated film strip is continuously advanced through a curved film gate. The film is driven by a capstan and pressure roller imposing direct pressure upon the film. Light is transmitted through a lens system and an opening in the shutter. Projected light transmitted through the film is intercepted by an oscillating mirror which is fixed on a shaft. The reflecting surface of the mirror passes through the mirror's pivot axis at the center of curvature of the film gate. Light reflected from the mirror passes through an objective lens and is reflected by a stationary mirror towards a viewing screen. In this system, the oscillation of the mirror is synchronized with the output drive of the motor. An electromechanical clutch is energized by the detection of the presence of a film discontinuity such as a sprocket hole. The clutch causes the rotation of the shaft which in turn winds a spring. When the clutch is de-energized at the completion of a movement cycle of the oscillating mirror, the shaft upon which the mirror is mounted is immediately rotated by the spring in a direction opposite to that of the first rotation. As a result, the mirror is returned to its starting position for the next cycle. The use of a clutch and a return spring obviously interject unwanted problems into the system. The mechanical engagement and disengagement of the clutch as well as the snap back action of the mirror will interject excessive noise in a manner which is intolerable for film projection and editing. In addition, the direct pressure imposed upon the film can cause damage to the film and as a result be deleterious to the total operation of the system.

Another film motion compensator disclosed by the prior art utilizes a rotating mirror mechanism. In this system, light is to be reflected from a mirror which is pivotally supported about an axis which is coincident with its reflecting surface. Oscillating movement is imparted to the mirror by a lever which has a small hook pivoted to its end in the position for engagement with the sprocket perforations of the film while it passes over an arcuate guide. The film is moved at a constant rate of speed over the arcuate guide. A small spring urges the hook towards its position of engagement with a sprocket hole in the film so that movement of the film swings the lever and the mirror in a counterclockwise direction. This cycle is repeated as the film moves and causes the image, which is focused at the surface of the film, to move the film to create a highly resolved record of the film during its uninterrupted motion. The retrace of the mirror is caused by the spring when the lever is disengaged. This system utilizes no means to block the output of the light source since it is assumed that the retrace movement of the mirror is so rapid that the effect of light upon the film during this period is negligible. The inadequacies with this system are apparent. The mechanical movement of the lever and retrace spring will impose undue stress upon the film sprockets themselves as well as result in movement which cannot accurately track a film frame. In addition, the fly-back of the mirror utilizes the spring tension of the spring and thereby interjects noise components which the present invention seeks to obviate.

The present invention substantially resolves the difficulties which still remain in the continuous film motion projector disclosed by the prior art. The present invention utilizes a film movement mechanism which in no way bears upon the film frame and thereby protects the surface of the celluloid film The film is moved over a projection gate at a constant rate of speed, the same motive force used to move the film being employed to provide the motive force to the projecting mirror. To avoid the interjection of unwanted noise, a series of electromagnets or a slot cam are rotated in synchronism with the film movement mechanism. The oscillating mirror is aligned with the projection gate, the mirror rotating on a shaft which is in axial alignment with the electromagnet assembly. At the terminus of the shaft opposite that of the mirror, a ferromagnetic member is disposed in alignment with the poles of the electromagnet. Sequencing of the electromagnet will provide for rotation of the mirror in precise synchronism with the film movement, the retrace of the mirror being carried out without the use of any mechanical springs or like elements. The present invention will provide for accurate tracking of film frames, will be substantially noiseless and will provide for a stabilized film image for an interval of the total cycle which substantially surpasses the devices taught by the prior art.

SUMMARY OF THE INVENTION

The present invention utilizes a rotating mirror mechanism to transmit a stationary film image and return to its initial starting position during the time in which a film frame passes over a projection gate. The film passes through the present invention system at a constant rate, the motive force used to drive the film being used to control the movement of the tracking mirror. The film is moved over an arcuate projection gate at a constant speed, the tracking mirror rotating about its reflecting axis at an angular velocity which is substantially one-half of the angular velocity of the film as it passes over the projection gate. When synchronized, the present invention will provide a stabilized image of the film image for a greater period of the total cycle than those systems described in the prior art.

To synchronize the movement of the film strip and the tracking mirror, the motive force moving the film strip is coupled to a shaft which is substantially aligned with the shaft about which the tracking mirror rotates. In synchronism with the film movement, a set of electromagnets providing an induced magnetic field intermediate the poles thereof are disposed about the axis of the shaft. A commutator provides for electrical connection between an appropriate direct current supply and the electromagnets to provide for diametrically opposed magnetic poles uniformly disposed about the driving shaft. The tracking mirror is mounted upon a shaft which passes through the mirror's pivot axis at its reflecting surface, the shaft being in alignment with the axis of the electromagnet assembly. At the terminus of the mirror shaft is disposed a ferromagnetic member which is adapted to be substantially aligned between diametrically opposed electromagnetic poles. The only coupling between the ferromagnetic follower affixed at the terminus of the mirror shaft and the electromagnet assembly is the magnetic force which is imposed upon the follower when the electromagnetic assembly is coupled to a power source.

When the electromagnetic assembly is energized, a suitable commutator provides for sequential energizing and therefore creates diametrically opposed magnetic poles. As the electromagnetic assembly is rotated in synchronism with the movement of the film strip, the ferromagnetic follower affixed at the terminus of the mirror shaft will align itself with energized electromagnets and rotate at precisely the same velocity as the electromagnet assembly. The commutator constitutes a series of contacts which provides for energizing specific pole pieces. Each pair of aligned electromagnetic poles are separated by a distance which constitute the angular arc through which the mirror will pass to track the appropriate film frame. Each time a pair of aligned electromagnetic poles are energized, the ferromagnetic follower affixed to the mirror shaft will be magnetically bound thereto and will rotate the mirror in an appropriate direction to track the film frame. When the next sequential set of commutator contacts are reached, the next set of electromagnetic poles will be energized thereby causing the mirror to retrace its motion and be in position to track the next film image. During the retrace of the mirror, the light from the image forming source will be blocked to insure that no visual interference appears during the retrace segment of the cycle.

It is therefore an object of the present invention to provide an improved continuous film motion compensating apparatus.

It is another object of the present invention to provide a continuous film motion projecting apparatus which utilizes electromagnetic control.

It is still another object of the present invention to provide control means for a continuous film motion compensating apparatus which reduces induced noise.

It is still yet another object of the present invention to provide an improved continuous film motion compensating apparatus which is simple and inexpensive to fabricate.

The novel features which are believed to be characteristic of the invention, both as to its organization and method of operation, together with further objectives and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

The basic object of the present invention is acheived by projecting film frame images from a film strip which is moving through the present invention appratus at a constant velocity. The film images are projected upon a pivotable mirror which is rotating about a pivot axis at its reflecting surface. The mirror, when rotating in the same direction as the flim, projects a stationary image onto the viewing screen. The mirror retraces its movement to its initial position during the time when the projecting light source is blanked out.

Figure 1:
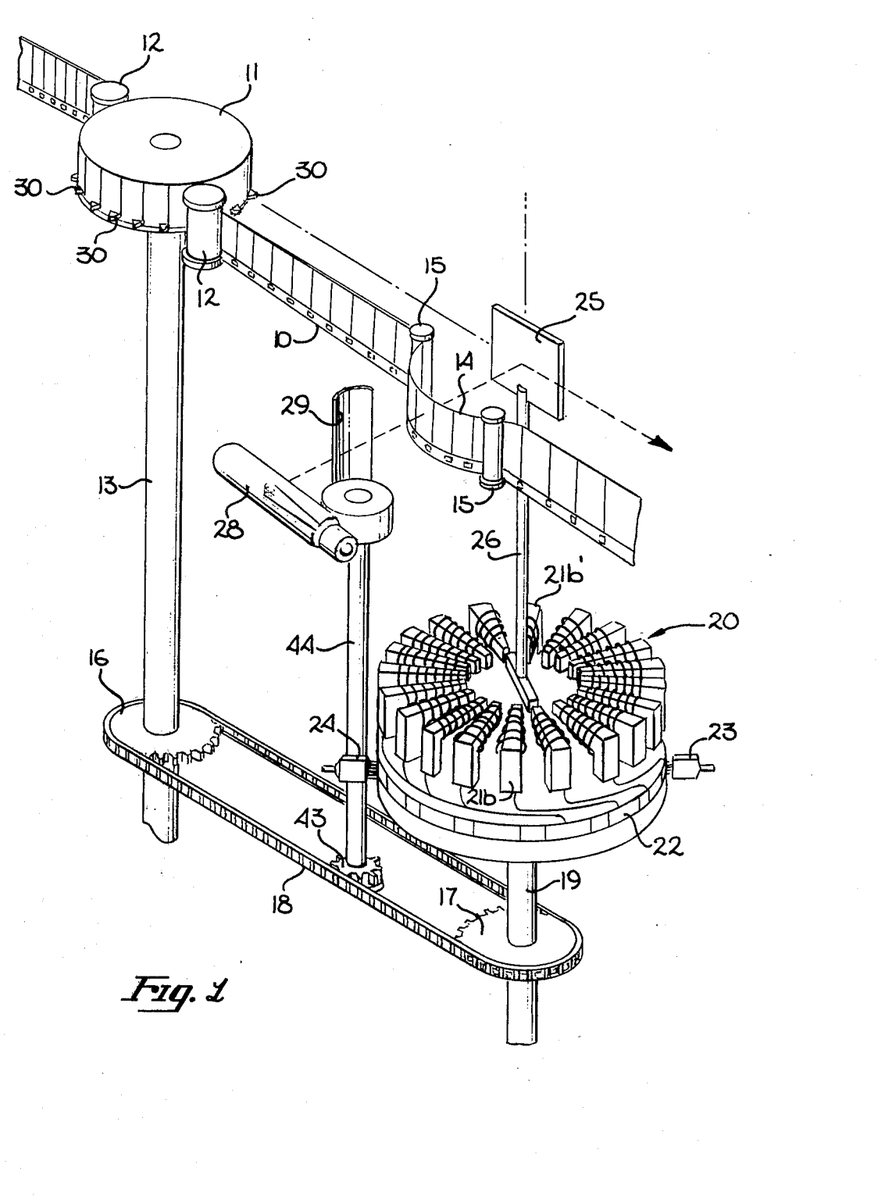
FIG. 1 is a schematic perspective view of a preferred form of a continuous film feed apparatus in accordance with the present invention.

An understanding of the operation of a continuous film feed apparatus in accordance with the present invention can be best gained by reference to FIG. 1 wherein a form of the present invention is shown. A film strip 10 is driven about sprocket wheel 11 and film guides 12, sprocket wheel 11 being rotatably driven by shaft 13. Shaft 13 is powered by a conventional constant speed motive source which is not shown. Film strip 10 is guided around arcuate projection guide 14 and roller gudes 15 and onto a takeup reel which is not shown. Shaft 13 has coupled thereto sprocket wheel 16 which in turn is coupled to sprocket wheel 17 by belt 18. Although a preferred form of the present invention uses sprocket wheels 16 and 17 and a suitable belt 18, it is obvious to one having skill in the art that sprocket wheels 16 and 17 could be replaced by appropriate pulleys and mating endless rubber belts.

Sprocket wheel 17 is disposed about shaft 19 which supplies the rotating driving force to same. Electromagnet assembly 20 is mounted upon shaft 19 along the axis thereof and rotates with shaft 19. As will be described in detail hereinbelow, electromagnet assembly 20 comprises diametrically opposed poles of ferromagnetic material which are appropriately wound with sufficient windings to insure the establishment of an appropiate magnetic field upon energizing the windings disposed thereabout. Each pair of pole pieces 21a, 21a', 21b, 21b', etc., are in diametrically opposed positions to insure the creation of diametrically opposed magnetic poles upon energizing. The windings disposed about each pole piece are connected to appropriate commutator contacts 22, the commutator contacts being coupled to a source of direct current by brushes 23 and 24.

As stated previously, one of the objectives of the present invention is to transmit a film image to a viewing screen pursuant to an oscillating mirror 25 which tracks the film image and maintains same in a stationary condition during this portion of the total cycle. Referring again to FIG. 1, oscillating mirror 25 is disposed at the center of a circle, the circumference of which is bound by arcuate projection gate 14. Oscillating mirror 25 rotates upon shaft 26 about a pivot axis at its reflecting surface. Mounted at the terminus of shaft 26 in axial opposition to mirror 25 is ferromagnetic follower 27. Ferromagnetic follower 27 is mounted at the center of electromagnet assembly 20, follower 27 being disposed between the ends of the pole pieces 21. When one of the pole pieces 21 is energized, ferromagnetic follower 27 will align itself in the field created between the core pieces 21a, 21a', 21b, 21b', etc.

Light source 28 provides the source of illumination for transmission of the film image to a viewing screen. As was stated previously, the present invention operates through the use of tracking mirror 25. Oscillating mirror 25, as will be explained in detail hereinbelow, retraces its rotation during a small portion of the operating cycle. In order to avoid unwanted viewing images during the retrace of mirror 25, shutter 29 is driven in synchronism with the movement of film strip 10 and mirror 25 to insure that the output of light source 28 is blocked by shutter 29 during the retrace of mirror 25.

Where sprocket wheel 11 has a given radius, arcuate projection gate 14 will have a radius of substantially one-half of that of sprocket wheel 11. As the result, the angular velocity of film strip 10 as it passes over arcuate film gate 14 will be substantially twice the angular velocity of sprocket wheel 11.

In a typical embodiment of that shown in FIG. 1, sprocket wheel 11 utilizes twenty sprockets 30 about its circumference. Each sprocket 30 will engage the film perforation adjacent a film frame. The relationship between arcuate projection gate 14 and sprocket wheel 11 establishes the number of pole pieces 21 in electromagnetic assembly 20. The relationship between arcuate projection gate 14, sprocket wheel 11 and electromagnetic assembly 20 insures that mirror 25 will scan at an angular velocity equal to one-half the angular velocity of the film strip as it passes over arcuate projection gate 14, the angular interval between each pole piece 21 being synchronized to an individual film frame.

Arcuate film gate 14 utilizes parallel spaced members adapted to slidingly receive the transverse edges of film strip 10 and thereby reduce unwanted contact with the face of film strip 10. A suitable one-to-one gear ratio between sprocket wheel 16 and 17 will rotate shaft 19 at the same angular velocity as shaft 13 and sprocket wheel 11. In order to provide a substantially stationary image of the film frame passing over arcuate projection gate 14, the angular velocity of mirror 25 must be matched to the angular velocity of the film as it passes over arcuate projection guide 14. Where mirror 25 pivots about a pivot axis which is at the center of a circle, the circumference of which constitutes arcuate projection gate 14, mirror 25 must have an angular velocity of one-half the value of the velocity which the film strip 10 moves over projection gate 14. As will be described hereinbelow, another form of the present invention which utilizes telecentering optics permits mirror 25 to scan at an angular velocity equal to the value of the velocity of the film strip as it passes over projection gate 14. Since a suitable implementation for sprocket wheel 11 utilizes twenty sprockets 30, each film frame will occupy 18° of arc. To appropriate matching of the size of sprocket wheel 11 and electromagnet assembly 20, electromagnet assembly 20 employs twenty pole pieces 21a, 21a', 21b, 21b', etc., each pole piece being separated by 18° of arc. It is to be emphasized that the use of a sprocket wheel 11 having 20 sprockets 30 and an electromagnetic assembly 20 employing 20 pole pieces 21 is only a matter of choice. So long as the appropriate relationship between the scanning velocity of mirror 25 and the velocity of film strip is maintained, the specification on the size of sprocket wheel 11 and the number of pole pieces 21 can be adjusted accordingly.

Figures 2, 3A:
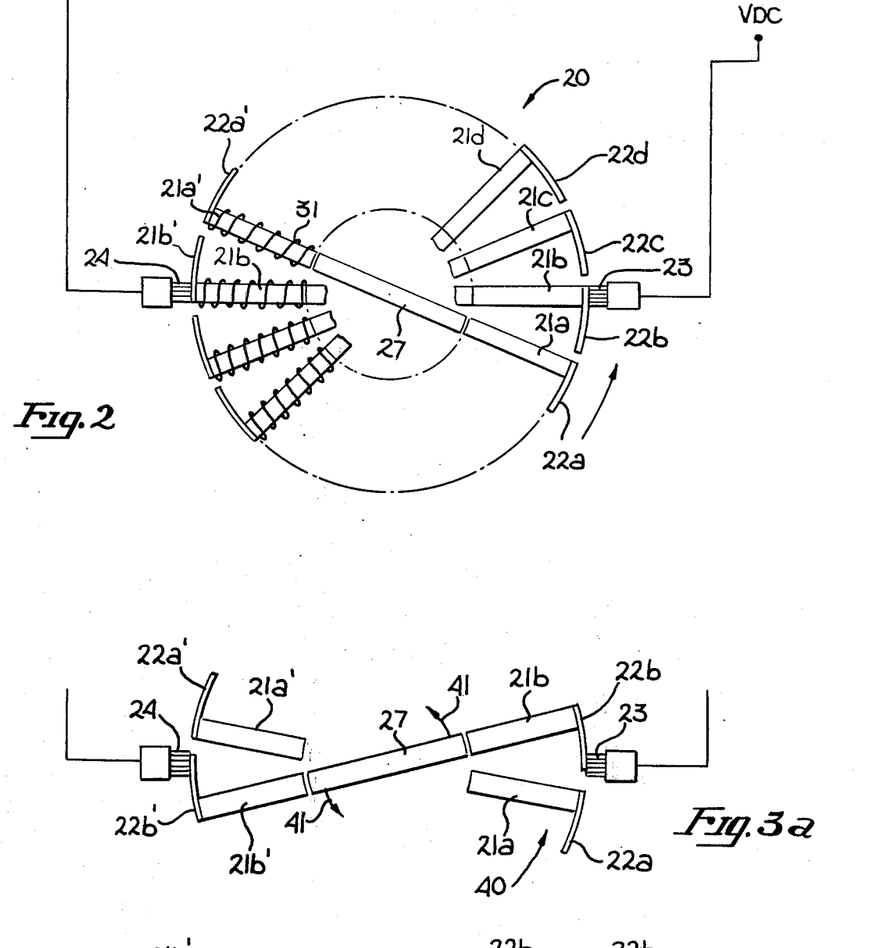
FIG. 2 is a schematic, top plan view of the electromagnegtic assembly used to oscillate the tracking mirror of the present invention.
FIG. 3a and FIG. 3b illustrate successive cyclic positions of the magnet follower in accordance with the present invention.
Figure 3B:
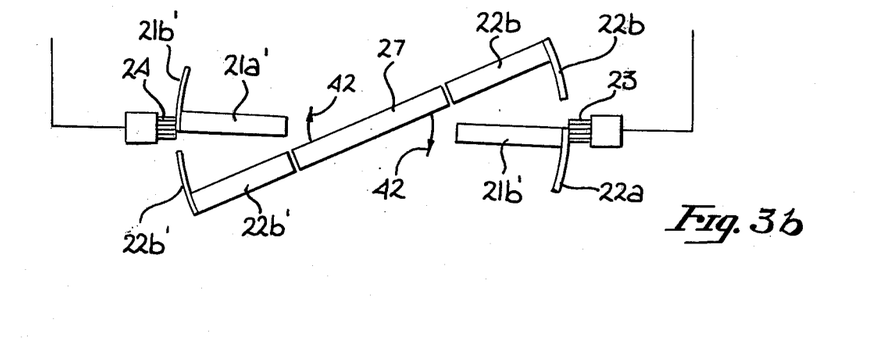

Referring now to FIG. 2, FIG. 3a and FIG. 3b, an understanding of the operation of the preferred form of the present invention shown in FIG. 1 can be best understood. FIG. 2 illustrates a top plan, schematic view of electromagnet assembly 20. As shown in FIG. 2, typical core piece 21a–21a' is appropriately wound with a sufficient number of windings 31. Core piece 21a–21a' is fabricated of a ferromagnetic material such that when a direct current passes through winding 31 a suitable magnetic field will be induced across the gap intermediate the termini of core piece 21a–21a'. Winding 31 is terminated at commutator contacts 22a, 22a' which will be put in electrical connection with the direct current power source. As shown in FIG. 2, commutator brushes 23 and 24 are in contact with commutator contacts 22b and 22b' thereby energizing core pieces 21b–21b' and appropriately aligning ferromagnetic follower 27.

FIG. 3 illustrates the manner in which magnet follower 27 is moved in a counterclockwise direction which will permit appropriate tracking of film strip 10 as it passes over arcuate projection film gate 14. Since electromagnet assembly 20 is being driven at the same angular velocity as sprocket wheel 11, the individual core pieces 21 will be precisely aligned with individual film frames being driven by sprockets 30. As shown in FIG. 3a, arrow 40 illustrates the rotational motion of electromagnet assembly 20. For the purpose of clarity, the schematic depiction shown in FIG. 3a is a continuation of the motion shown in FIG. 2. As electromagnet assembly 20 rotates in the counterclockwise direction, commutator contacts 22b and 22b' will begin to pass beyond commutator brushes 23 and 24 respectively. So long as commutator contacts 22b and 22b' remain in contact with brushes 23 and 24 respectively, direct current will pass through the windings about pole piece 21 thereby maintaining an appropriate magnetic field and maintaining the alignment with ferromagnetic follower 27. As can be seen from FIG. 3a and FIG. 2, ferromagnetic follower 27 has rotated in a counterclockwise direction precisely following the motion of electromagnet assembly 20, the motion being designated by the reference numeral 41. Since ferromagnetic follower 27 is rotating at the same angular velocity as electromagnet assembly 20, and since electromagnet assembly 20 is being driven at the same angular velocity as sprocket wheel 11, the counterclockwise motion of ferromagnetic follower 27 will be precisely one-half the angular velocity of film strip 10 as it passes over arcuate projection film gate 14. Referring again to FIG. 1, shaft 26 couples mirror 25 to magnet follower 27 thereby rotating mirror 25 at preciseldy one-half the angular velocity of film strip 20 as it passes over projection film gate 14. The motion of magnet follower 27 and coupled mirror 25 will insure the projection of the stationary image on the viewing screen.

As stated previously, where sprocket wheel 11 utilizes 20 sprockets 30, each film frame will be separated by 18° of arc. In a like manner, each set of core pieces 21 and commutator contacts 22 are separated by 18° of arc. Referring now to FIG. 3b, a schematic depiction of the retrace cycle of mirror 25 is shown. As can be seen in FIG. 3b, the motion 40 of electromagnet assembly 20 has commutator contacts 22c and 22c' beyond commutator brushes 23 and 24 respectively thereby collapsing the magnetic field created at core piece 21. When commutator contacts 22b and 22b' are in electrical contact with commutator brushes 23 and 24, a suitable magnetic field is created at core piece 21b–21b'. Ferromagnetic follower 27 will respond to the induced magnetic field at core piece 21b–21b' and rotate in a clockwise direction as designated by the reference numeral 42. As stated previously, since commutator contacts 22b–22b' are separated from adjacent commutator contacts by the defined angular interval, follower 27 and coupled mirror 25 will return to their initial state and be prepared to track the next adjacent film image.

An object of the present invention is to provide for the tracking of a film image as the film strip 10 passes over projection gate 14 and maintain the image stationary on a viewing screen while the projection mirror 25 makes a rotation of something less than the full scan interval between film frames. Where the present invention utilizes an electromagnetic assembly 20, the ratio of projection to retrace time can be adjusted merely by changing the interval between commutator contacts. During the retrace of mirror 25, the image of the film as created by light source 28 will be blurred unless the path between the light source and mirror 25 is obstructed during the retrace interval. As shown in FIG. 1, a suitable shutter 29 is interposed between light source 28 and projection gate 14. Where sprocket wheel 11 utilizes 20 sprockets 30, shaft 13 and sprocket wheel 16 will rotate one revolution for each twenty frames of film strip 10. Since the form of shutter 29 shown in FIG. 1 must rotate once per film frame, gear 43 coupled to shutter shaft 44 must rotate 20 revolutions for each revolution of shaft 13. Under the assumed gear ratio and size of sprocket wheel 11, gear 43 will be in a 1:20 gear ratio with sprocket wheel 16. It would, of course, be obvious to one having skill in the art to adjust the gear ratios and sizes of the appropriate sprocket wheel to alter the manner in which shutter 29 can operate in a suitable manner.

The form of the present invention described in connection with FIGS. 1–3 utilize an electromangetic assembly 20 and a single pole, ferromagnetic follower 27. The gist of the present invention is to utilize electromagnetic control to permit oscillatory film scanning and return movement of follower 27, all movement of follower 27 being accomplished by proper control over the respective magnetic fields. It is therefore clear, and it would be obvious to one having skill in the art to substitute permanent magnets for the individual pole pieces 21 of electromagnetic assembly 20 and accordingly replacing ferromagnetic follower 27 with an appropriate electromagnetic equivalent.

Figure 4:
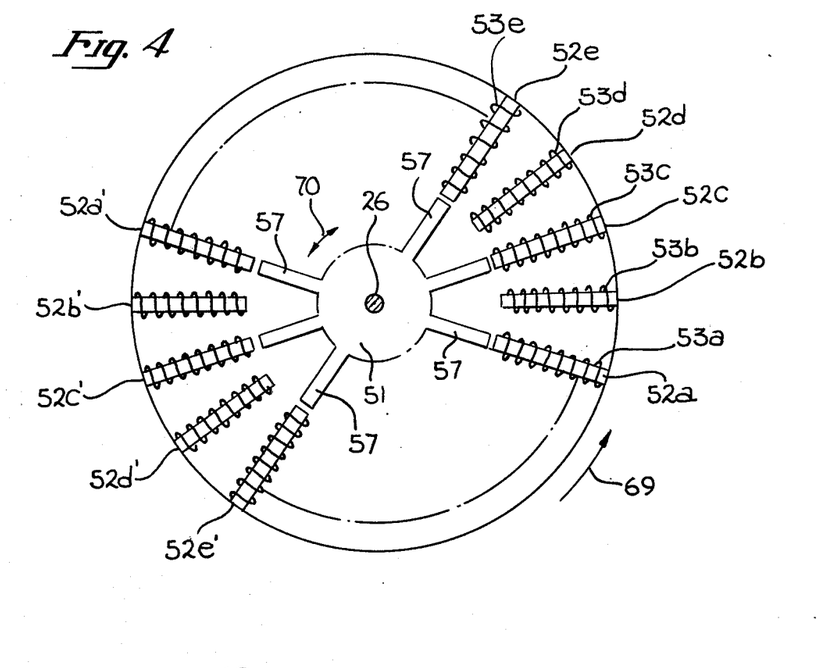
FIG. 4 is a schematic, plan view of a form of the present invention illustrating an electromagnetic assembly incorporating a multipole ferromagnetic follower.
Figure 5:
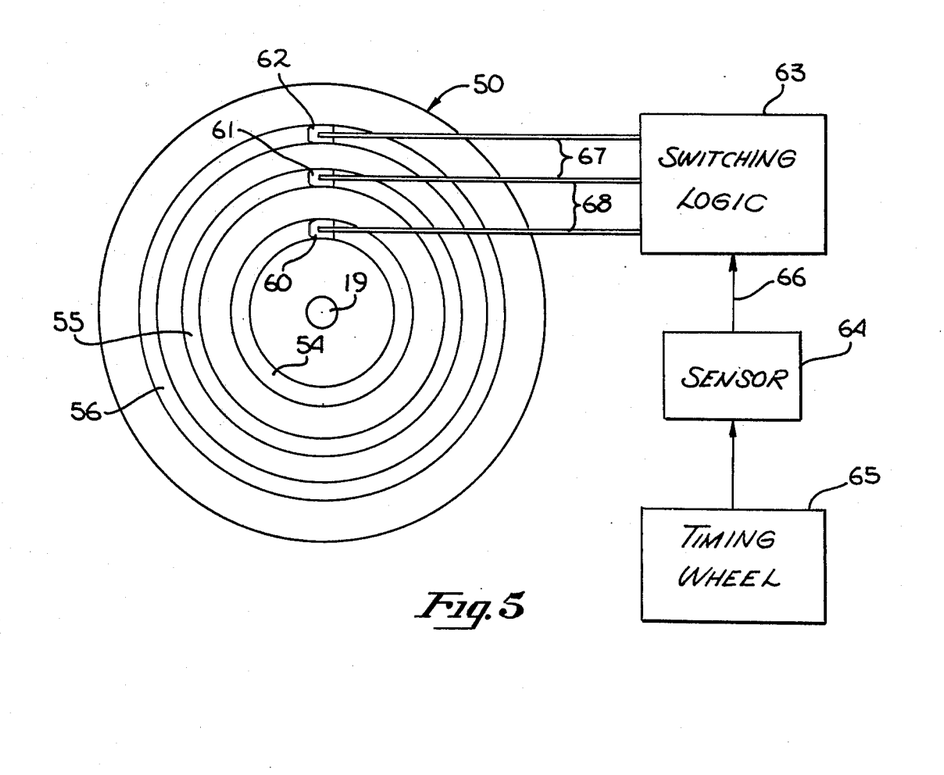
FIG. 5 is a schematic view of another form of the present invention including a bottom plan view of the electromagnetic assembly shown in FIG. 4.

The form of the present invention shown in FIGS. 1–3 represent a suitable form thereof. Referring now to FIG. 4 and FIG. 5, another form of an electromagnetic assembly is shown for use within the present invention, the magnetic assembly shown in FIG. 4 and FIG. 5 being generally designated by the reference numeral 50. For the sake of ease of explanation, those elements of FIG. 4 and FIG. 5 having couterparts in FIGS. 1–3 shall be designated by the same reference numerals. As shown in FIG. 1, the rotation of shaft 19 provides rotary motion to electromagnetic assembly 20. Electromagnetic assembly 50 (FIG. 4) is mounted upon shaft 19 and rotates about its axis on shaft 19. As will be explained hereinbelow, multipole ferromagnetic follower 51 is mounted at the terminus of shaft 26 in axial opposition to mirror 25. Referring again to FIG. 4, electromagnetic assembly 50 comprises diametrically opposed poles of ferromagnetic cores 52a–52a', 52b–52b', etc. An individual core 52a–52a' is fabricated of a suitable ferromagnetic material such as iron or nickel and suitably wound with a sufficient number of windings 53a to insure the establishment of appropriate magnetic field upon energizing the winding 53a disposed thereabout. Each of the remaining core pieces 52b–52b', 52c–52c', etc., are in a like manner wound with appropriate windings 53b, 53c respectively. The termini of each of the core pieces 52a–52a', 52b–52b', etc., are in diametrically opposed positions to insure the creation of diametrically opposed magnetic poles upon energizing. The windings 53a, 53b, etc., disposed about each core piece are connected to appropriate commutator tracks 54, 55 and 56 as shown in FIG. 5. The connection between the core pieces and commutator tracks 54, 55 and 56 will be described in detail hereinbelow.

Core pieces 52a–52a', 52b–52b', etc., define a cyclindrical cavity within which ferromagnetic multipole follower 51 is disposed. As can be seen in FIG. 4, follower 51 has a plurality of diametrically opposed arms 57, each one of the follower arms 57 being adapted to be aligned with respective pairs of electromagnetic cores 52a–52a', 52b–52b', etc. As stated previously, electromagnetic assembly 50 is adapted to be mounted upon shaft 19 and rotated about its axis. In a like manner, multipole follower 51 is adapted to be axially mounted upon the terminus of shaft 26.

Referring now to FIG. 5, a bottom plan view of electromagnetic assembly 50 is illustrated. As was discussed previously, electromagnetic assembly 20 utilized a set of commutator contacts 22 to couple a source of direct current power to the core pieces. As electropmagnetic assembly 20 or commutator brushes 23 and 24 contacted respective pairs of commutator contacts 22 to create a magnetic field intermediate the poles of a magnetic core piece 21. The embodiment of the present invention untilizing electromagnetic assembly 50 provides for energizing every other set of magnetic cores 52 in an alternate manner. As an example, poles 52a–52a', 52c–52c', 52e–52e' of the designated ferromagnetic cores will be energized during one interval, poles 52b–52b', 52d–52d', etc., of the alternate core pieces being energized at the next sequential timing interval. As can be seen in FIG. 4, multipole follower 51 has projection arms 57 which are adapted to be intermediate every other set of diametrically opposed poles 52.

In the case of electromagnetic assembly 20, the winding 31 for each core piece 21 was physically connected to a pair of commutator contacts 22. In electromagnetic assembly 50, each respective set of pole pieces 52 is connected in parallel to either commutator tracks 54 or 55 and commutator tracks 55 and 56. Commutator tracks 54, 55 and 56 are suitably metallized layers disposed on the bottom surface of electromagnetic assembly 50 and adapted to be contacted by conventional commutator brushes 60, 61 and 62 respectively.

The ability to energize the respective sets of core pieces 52 can be best seen by reference to FIG. 5. Commutator brushes 60, 61 and 62 are coupled to switching logic 63, the timing thereof being illustrated in FIG. 7. Sensor 64 derives an appropriate signal from drive wheel 65 to provide the formation necessary for applying a source of direct current power across commutator brushes 61 and 62 or 61 and 60. The manner of connecting the respective sets of windings 53 to either commutator contacts 54 and 55 or commutator contacts 55 and 56 will be obvious to one having skill in the art.

As stated previously, a conventional power source rotates shaft 13 (FIG. 1) which, in turn, provides for synchronous motive power to shaft 19 and 44. A suitable way for implementing the information source for switching logic 63, i.e., timing wheel 65 and sensor 64, is to provide an appropriate gear ratio between shafts 13 or 19 and timing wheel 65 to insure a fixed relationship between the rotation of timing wheel 65 and sprocket wheel 11. This will insure that timing wheel 65 is in a fixed relationship to each film frame of film strip 10. As an example, where timing wheel 65 rotates one revolution for each two film frames of film strip 10, and where diametrically opposed timing slots are disposed through timing wheel 65, a timing signal can be generated with respect to each film frame. Although the implementation of the timing signal upon the initiation of each film frame could utilize a number of conventional methods, a suitable structure would place a light source on one side of timing wheel 65, a photosensor being disposed on the opposite side of timing wheel 65 and in alignment with the light source. Each time a timing slot intersects the axis between the light source and sensor 64, an appropriate timing signal will be generated. Since the proposed structure for timing wheel 65 and sensor 64 will generate a timing signal to switching logic 63 for each film frame, switching logic 63 alternates the application of an appropriate electrical signal to commutator tracks 54 and 55 and commutator tracks 55 and 56 to provide for alternate energizing of core pieces 52.

Figure 7:
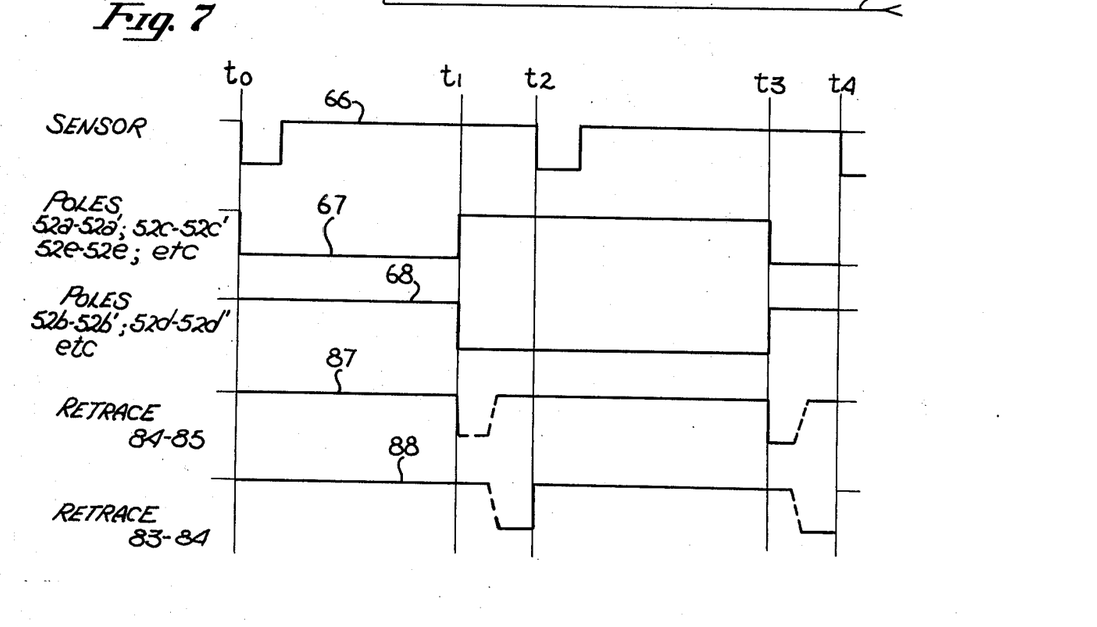
FIG. 7 is a timing diagram of the sensor and switching logic shown in FIG. 5.

The operation of electromagnetic assembly 50 can be best understood by reference to FIG. 7 wherein a timing diagram illustrating the output of switching logic 63 is shown. Trace 66 represents the output of sensor 64 and the input to switching logic 63. Trace 67 represents the signal intermediate commutator brushes 61 and 62, traces 68 representing the signal intermediate brushes 60 and 61. For the purpose of example, it is assumed that windings 53a, 53c, 53e, are connected across commutator tracks 55 and 56, windings 53b, 53d, etc., being connected across commutator tracks 54 and 55. As shown in FIG. 7, the interval $t_0$–$t_1$ is the scan cycle for a film frame, the interval $t_1$–$t_2$ being the return or retrace of mirror 25 to set up for the next film frame. The interval $t_2$–$t_3$ comprises the scan interval for the next sequential film frame, the timing interval $t_3$–$t_4$ being the return of mirror 25 to set up for the next film frame.

To illustrte the operation of electromagnetic assembly 50, arrow 69 represents the rotation of assembly 50. At time $t_0$, sensor 64 outputs a logically true pulse indicating the initiation of a film frame. The pulse at $t_0$ causes trace 67 to go to a logically true state thereby placing a direct current power signal across commutator tracks 55 and 56 causing core pieces 52a–52a', 52c–52c', 52e–52e', etc., to be energized. As can be seen from FIG. 4, arms 57 are suspended intermediate poles 52a–52a', 52c–52c', 52e–52e', etc., as a result of the magnetic field created therebetween. Since electromagnetic assembly 50 is rotating as shown by the reference numeral 69, multipole follower 51 will rotate at the same speed as electromagnetic assembly 50 causing shafts 26 and mirror 25 to rotate at an angular velocity which is synchronized with the rotation of sprocket wheel 11 and the movement of film strip 10. At time $t_1$, the scan cycle of mirror 25 is terminated, the mirror 25 having to return to its initial condition to set up for scanning the next sequential film frame. At time $t_1$, trace 67 is reset and trace 68 set to a logically true condition. The occurrence of such events will turn off the direct power source signal across commutator tracks 55 and 56 and turn on a direct power source signal across commutator tracks 54 and 55. Since multipole follower 51 is no longer being held in the field of poles 52a–52a', 52c–52c', 52e–52e', arms 57 will be attracted by the increasing magnetic fields of poles 52b–52b', 52d–52d' and be rotated in a clockwise direction returning mirror 25 to its initial condition, the oscillatory motion of multipole follower 51 being designated by the reference numeral 70.

The output of signals 67 and 68 upon the receipt of sensor signal 66 can be generated by conventional logic such as appropriately timed one-shot multivibrators, the implementation thereof being obvious to one having skill in the art.

The implementation of electromagnetic assembly 50 provides additional advantages over the single energized pole configuration shown in FIG. 2. Since an objective of the present invention is to provide for accurate tracking of a film frame during scanning, and to insure that the stationary image is maintained for as long an interval as is possible, it is clear that the ferromagnetic following member must be precisely registered with the energized poles of the electromagnetic assembly. In FIG. 2, follower 27 is subject to the magnetic field of only a single set of core poles. If either of the poles of a core 21 of electromagnetic assembly 20 becomes deformed or otherwise out of alignment, follower 27 will align itself within the magnetic field and thereby cause misalignment with the film frame. In the form of the electromagnetic assembly 50 shown in FIG. 4, the plurality of arms 57 each align themselves with respective pairs of core poles 52. In the form of the present invention utilizing 10 pairs of poles, five arms 57 will be aligned thereby providing for an average placement of follower 51, the average positioning tending to negate individual flaws in the alignment or registration of the core poles 52. As a result, electromagnetic assembly 50 will enhance the operation of the present invention by providing for more accurate tracking of the film strip 10.

Figure 6:
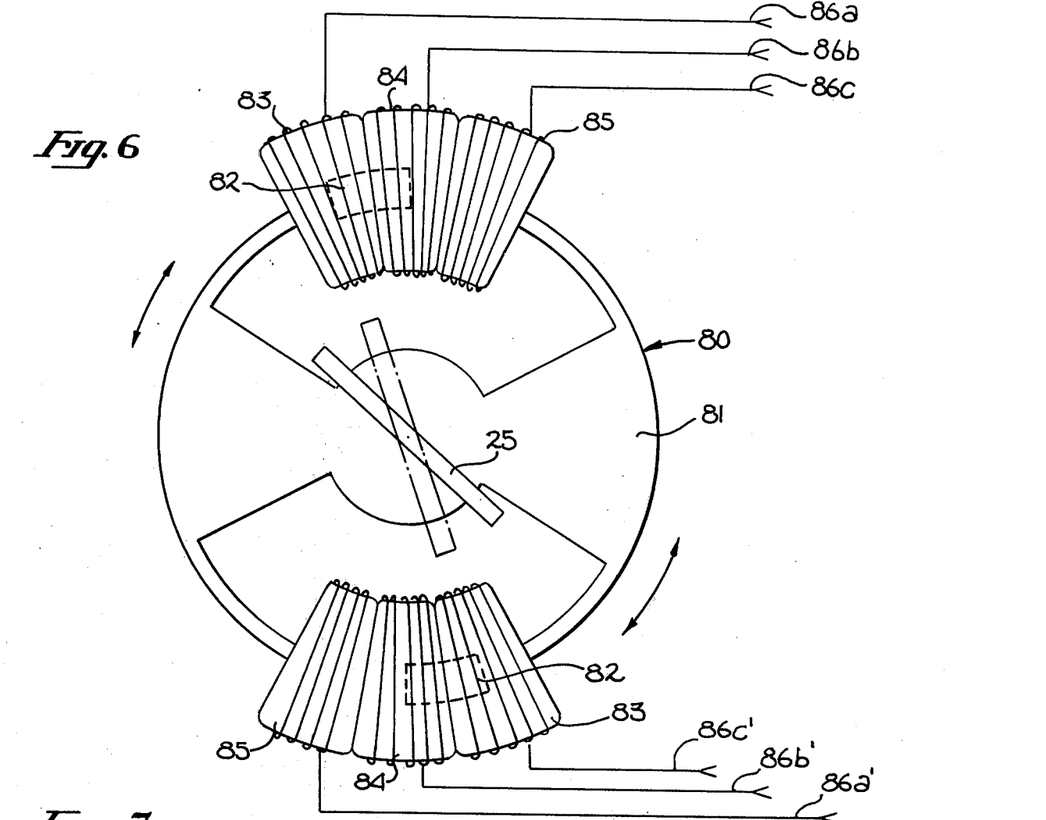
FIG. 6 is a schematic view of a retrace assembly utilized by the form of the present invention shown in FIG. 4 and FIG. 5.

As stated previously, one of the necessary elements of the present invention is to assure that mirror 25 returns to its initial position and be in a stable state preparatory to commencing the next scan cycle. In addition, one of the objectives of the present invention is to provide a continuous film feed apparatus which provides a stationary film image for a greater portion of the total duty cycle than the systems disclosed by the prior art. One of the critical features in increasing the proportion of the scan cycle is the necessity to have mirror 25 return to its initial position as quickly and as accurately as possible. Referring now to FIG. 6, an auxiliary retrace assembly is shown, the assembly being generally designated by the reference numeral 80. Although it is clear that retrace assembly 80 can be utilized with either electromagnetic assemblies 20 or 50, for the purpose of explanation the discussion of retrace assembly 80 will be based on the use of electromagnetic assembly 50. Retrace assembly 80 is mounted upon shaft 26 (FIG. 1) and comprises an axailly mounted disc 81 having a pair of diametrically opposed ferromagnetic members 82 mounted along the circumference thereof. Disposed adjacent disc 81 are three ferromagnetic solenoid cores 83, 84 and 85. Each of the cores 83, 84 and 85 are appropriately wound such that a suitable magnetic field will be generated upon the supply of power thereto. The input leads to solenoids 83, 84 and 85 are identified as input lines 86a–86a', 86b–86b', 86c–86c' respectively. Solenoids 83, 84 and 85 are mounted adjacent ferromagnetic members 82. In one form of retrace assembly 80, member 82 is a ferromagnetic member operating as a solenoid core such as iron or nickel which will be attracted to an adjacent magnetic field. Upon energizing solenoids 83 and 84, members 82 will rotate until they are within the center of the generated fields. When solenoids 84 and 85 are energized, disc 81 and members 82 will rotate clockwise to center themselves within the generated magnetic fields of solenoids 84 and 85. FIG. 6 illustrates mirror 25 at the end of the scan cycle, i.e., time $t_1$ or $t_3$ (FIG. 7). As described previously, switching logic 63 will change the magnetized poles of electromagnetic assembly 50 causing multipole follower 51 to retrace its path by turning in a clockwise direction. Retrace assembly 80 provides an accelerating force to follower 51 and provides for more accurate positioning of follower 51 and mirror 25 at the termination of the retrace cycle, i.e., time $t_2$ or $t_4$ (FIG. 7). Referring again to FIG. 6, ferromagnetic members 82 are disposed adjacent solenoids 83 and 84 prior to the initiation of the return cycle. At time $t_1$, signal 87 is applied to solenoids 84 and 85 as shown by the logical change in the level of signal 87. Turning on solenoids 84 and 85 will cause disc 81 and ferromagnetic members 82 to rotate in a clockwise direction thereby accelerating the rotation of shaft 26 and mirror 25. As stated previously, one of the difficulties sought to be overcome by the present invention is to provide a stable condition for mirror 25 prior to the initiation of the next scan cycle. As can be seen from the interval between $t_1$ and $t_2$ in FIG. 7, signal 88 is switched to the true condition and signal 87 returned to the false state at a suitable time to provide for a retardation of the clockwise rotation of disc 81. Signal 88 is applied to retrace solenoids 83 and 84, the switching of signals 87 and 88 providing accelerated return of mirror 25 while damping oscillatory movement which would otherwise occur after the switching of signal 68 at time $t_1$.

At time $t_2$, the magnetic field established at cores 52b–52b', 52d–52d', etc., along with the forces imposed by retrace assembly 80 have placed mirror 25 at its initial position and prepared same to scan the next film frame of film strip 10. As can be seen at time $t_2$, sensor 64 detects a timing slot from timing wheel 65 and provides a pulse signal 66 to switching logic 63. Since signal 68 is already at a true state, the pulse of signal 66 at signal time $t_2$ will reset signal 88. The switching of signals 67, 68, 87 and 88 are typically implemented through the use of conventional one-shot multivibrator which can be timed in an accurate manner from the occurrence of the sensed information from timing wheel 65. Although switching logic 63 can be implemented through other suitable logic such as flip-flop or other known logical elements, it is preferred that adjustable, conventional one-shot multivibrators be used to implement switching logic 63.

Figure 8:
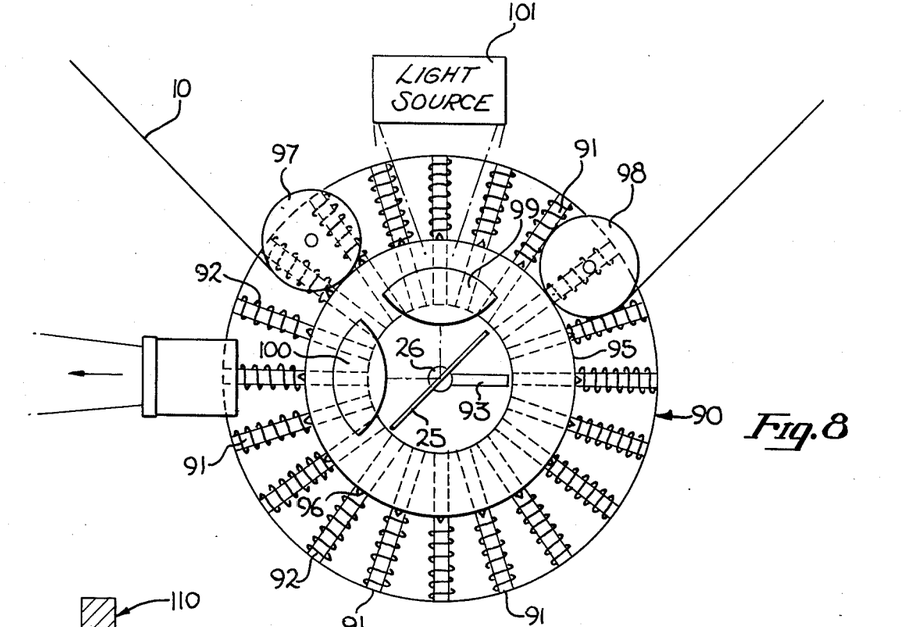
FIG. 8 is a side elevation view of another form of the present invention utilizing telecentering optics.

An alternative form of the present invention is shown in FIG. 8. The form of the invention shown in FIG. 8 is capable of utilizing either electromagnetic assembly 20 or 50, but it incorporates a telecentering optics system. As was described previously, where systems such as that described in connection with FIG. 1 or FIG. 4 are employed, light passing through film strip 10 will create an image from a film frame which is reflected from mirror 25 to the projection or photographic media. In the utilization of such a system, film strip 10 passes over arcuate film gate 14, mirror 25 scanning at an angular velocity which is equal to one-half the angular velocity of film strip 10 as it passes over gate 14. The form of the present invention shown in FIG. 8 permits mirror 25 to scan at an angular velocity which is equal to the velocity of film strip 10. As stated, the form of the present invention shown in FIG. 8 can use either form of the electromagnetic assemblies 20 or 50 described hereinabove. For the purpose of example only, an electromagnetic assembly 20 in accordance with the principles shown in FIG. 2 shall be discussed, it being recognized that other forms of the described electromagnetic assemblies would be equally suitable.

The form of the present invention shown in FIG. 8 utilizes elements having counterparts in the previously described forms. For the sake of clarity, where the elements shown in FIG. 8 have direct counterparts, the same reference numerals shall be used. Referring now to FIG. 8, an electromagnetic assembly 90 is shown, electromagnetic assembly 90 including a plurality of core pieces 91 each having windings 92 disposed thereabout which will be energized in accordance with the principles discussed in connection with FIG. 2. A ferromagnetic, single pole follower 93 is disposed within the cylindrical cavity created by electromagnetic assembly 90 in the same manner as follower 27 was described previously. Shaft 26 axially rotates as a result of the action of follower 93, oscillating mirror 25 being disposed at the terminus thereof and operating in a manner shown in FIG. 1.

As described previously, sprocket wheel 11 provides the motive force for film strip 10 and has a diameter which was equal to twice that of arcuate projection gate 14. In the embodiment of the present invention shown in FIG. 8, a sprocket projection gate 95 incorporating the characteristics of both sprocket wheel 11 and arucate projection gate 14 is mounted in a fixed relationship to electromagnetic assembly 90. Sprocketed projection gate 95 comprises a pair of parallel, spaced discs having a set of uniformly separated sprockets 96 along the circumference thereof. As stated previously, the spaced discs for sprockets 95 operate in a manner similar to projection gate 14 and permit contact with film strip 10 only along the lateral edges of film strip 10. Since sprocketed projection gate 95 will be in a fixed and immoveable relationship with respect to electromagnetic assembly 90, the powered rotation of electromagnetic assembly 90 will result in concurrent rotation of sprocketed film gate 95. Film guides 97 and 98 guide film strip 10 across sprocketed projection gate 95 and enable film strip 10 to move across and be cooperatively received by sprockets 96 in a manner which will not inhibit the continuous film feed characteristics of the present invention. A pair of identical optical lenses or lens groups 99 and 100 are disposed at right angles to one another. Lens 99 is mounted intermediate the pivot axis of mirror 25 and the surface of sprocketed projection gate 95 and is substantially aligned with light source 101. Lens 100 is disposed at a right angle to lens 99 and is located intermediate the pivot axis of mirror 25 and the surface of sprocketed projection gate 95 substantially adjacent the path to the projection screen or film photographing media.

The telecentering optical system shown in FIG. 8 permits mirror 25 to scan at an angular velocity which is equal to that of film strip 10 as it passes over sprocketed projection gate 95 because of the focal lengths of lenses 99 and 100. Each of the lens 99 and 100 have the same focal length, the focal length of each lens converging at the pivot axis of mirror 25 and the circumferential surface of sprocketed projection gate 95. The imposition of lenses 99 and 100 respectively divides in one half the optical radius of the system shown in FIG. 8 thereby requiring mirror 25 to douple its angular rotation to create a still image. Since the system shown in FIG. 8 will have a film strip 10 moving at an angular velocity over sprocketed film gate 95 which is euqal to the angular velocity of mirror 25, the reflected image will be stationary during the scan cycle of mirror 25. In addition, the form of the present invention shown in FIG. 8 will eliminate a number of components required by the system shown in FIG. 1 since the projection gate and sprocket drive shown in FIG. 1 will be incorporated into a single integrated unit defined by sprocketed projection gate 95. Lastly, the need to utilize a projection gate 14 which has a radius of precisely one-half that of sprocket wheel 11 is also elimianted since the integrated sprocketed film gate 95 incorporates both structural characteristics into a single unit. It is understood that the film sprocket ring 96 and electromagnetic assembly are revolving as an integral member which improves film registration even further.

Figures 9, 10:
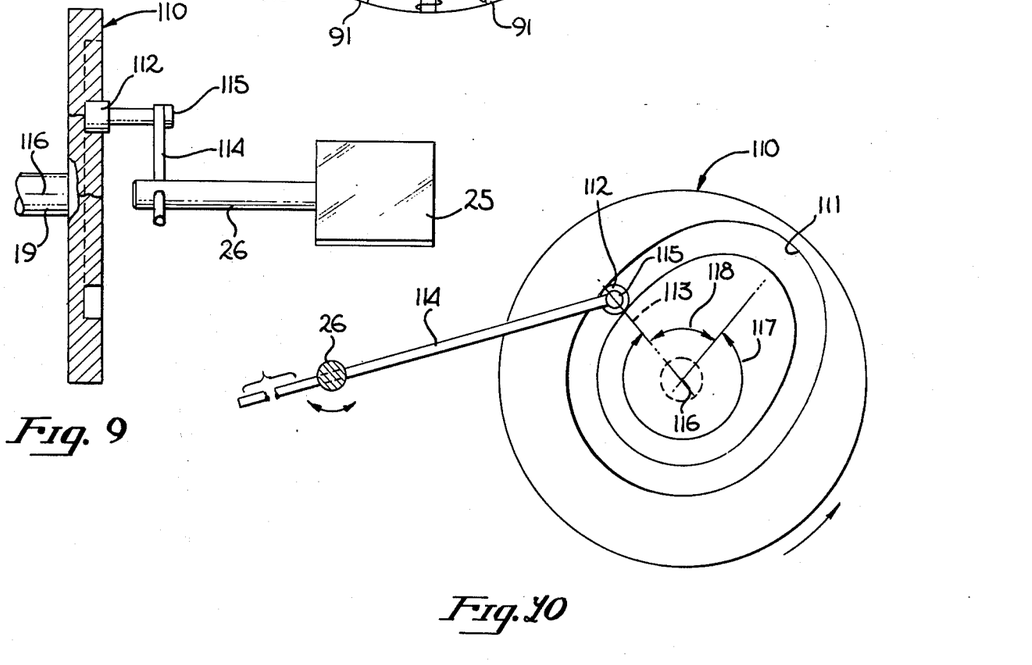
FIG. 9 illustrates another form of the present invention utilizing a slot cam for oscillating the tracking mirror.
FIG. 10 illustrates a side elevation view of the slot cam connections to the tracking mirror in accordance with the present invention.

Another form of the present invention can be best seen by reference to FIG. 9 and FIG. 10 wherein a slot-cam member is substituted in place of electromagnet assembly 20 or 50 and ferromagnetic follower 27 or 51 respectively, the slot-cam being generally designated by the reference numeral 110. The top plan schematic view of the cam lobes defining channel 111 is best seen in FIG. 10, the effect of the cam porfile on cam follower 112 being described in detail hereinbelow. As shown in FIG. 9, slot-cam 110 is rotated upon shaft 19 which in turn is driven by the same power source as used to drive sprocket wheel 11. As shown in FIG. 10, slot-cam 110 is a substantially cylindrical member which incorporates a channel 111 which is substantially uniform in depth and width but which has appropriate cam lobes to produce the appropriate oscillations of mirror 25. Cam follower 112 is slidably disposed within channel 111 and follows the motion of the cam lobes. In order to simplify the description of this form of the present invention, elements in FIGS. 9 and 10 having counterparts in the previously described figures shall be designated by the same reference numerals. Cam follower 112 will move inwardly and outwardly along a radial path 113 in conformity with the direction imposed by the cam lobes. Arm 114 is coupled to shaft 115 which transmits the radial motion of channel 111 and imparts oscillatory motion to shaft 26 which in turn pivots mirror 25.

The principle of slot-cam 110 is apparent from the geometrical relationship of the cam lobes defining channel 111, cam follower 112 and mirror 26. Cam 110 rotates about its axis 117 in a counterclockwise direction. Since the distance between axis 116 and shaft 26 is fixed, and since shaft arm 114 is also a fixed length, the only variable is the interval intermediate the axis of slot-cam follower 112 and axis 116. Since it is assumed film strip 10 moves over projection gate 14 in the direction shown, mirror 25 must rotate in a counterclockwise direction to transmit the film image to a viewing screen. In order for shaft 26 and coupled mirror 25 to rotate counterclockwise, the interval between axis 116 and cam follower 112 must increase thereby causing cam follower 112 to move radially outwardly. The scan section of slot-cam 110 is designated by the reference numeral 117. The cam lobe intermediate the arrows of scan section 117 produce a continuously increasing radial movement of cam follower 112 thereby causing counterclockwise rotation of shaft 26 and the coupled mirror 25. The return or retrace cycle of mirror 25 is designated by the reference numeral 118. Since the retrace portion 118 of the duty cycle is required only to return mirror 25 to its initial starting position to prepare same for tracking the next film frame, the cam lobe defining the retrace section 118 reduces the interval between axis 116 and cam follower 112 as fast as possible. The result of the retrace portion 118 of the total duty cycle is to rotate shaft 26 and coupled mirror 26 in a clockwise direction and place mirror 25 in position to track the next film frame.

The present invention provides a device for projecting or photographing images without the use of intermittent film motion devices or continuous film feed apparatus which are inadequate. Through the use of electromagnetic assemblies 20 or 50, or a slotcam 110, an oscillating mirror 25 is permitted to track a specific film frame and transmit a stationary image on a viewing screen in a manner which surpasses the devices disclosed by the prior art. The present invention interjects little noise in the operation since there is a minimum of contacting parts. In addition, the present invention can provide a stationary image for a large portion of the projection cycle since the retrace of the reflecting member can be carried out without springs or other mechanical aids.

We claim:

1. A continuous film feed motion picture apparatus comprising:
   a. a light source;
   b. film feed means for moving the film strip through said apparatus at a predetermined, constant velocity;
   c. an arcuate film gate including a pair of parallel spaced members adapted to engage the transverse edges of the film strip;
   d. a first shaft being disposed through the center of a circle whose circumference includes said arcuate film gate;
   e. a reflecting member aligned with said film gate and said light source whereby light transmitted through the film strip is reflected from said reflecting member, said reflecting member being mounted upon said first shaft at the pivoting axis of said reflecting member;
   f. rotating means for rotating at an angular velocity proportional to the angular velocity of the film strip over said arcuate film gate, said rotating means comprising:
      i. a direct current power source;
      ii. a plurality of ferromagnetic core pieces each having a pair of termini, said core pieces being in cylindrical alignment with each other and coupled to said film feed means, each core piece having its pair of termini in diametrically opposed positions, each core piece being uniformly spaced from the adjacent core piece and defining an interior, axial cavity;
      iii. a plurality of pairs of commutator contacts in uniform spaced relation to given ones of said cylindrical aligned core pieces, each pair of said commutator contacts being in diametrically opposed relation to one another;
      iv. a plurality of windings, one being disposed about each of said core pieces, each of said windings having first and second contacts, said first and second contacts of each of said windings being connected to respective pairs of commutator contacts;
      v. brush means for sequentially coupling said direct current power source to said commutator contacts; and
   g. oscialating means for oscillating said first shaft about the axis thereof and imparting reciprocating rotational motion to said reflecting member, said oscillating means being coupled intermediate said first shaft and said rotating means.

2. A continuous film feed motion picture apparatus as defined in claim 1 wherein said oscillating means comprises a ferromagnetic follower mounted upon the end of said first shaft in axial opposition to said reflecting member, said ferromagnetic follower being suspended between the termini of said core pieces within said interior, axial cavity.

3. A continuous film feed motion picture apparatus as defined in claim 2 further including a retrace assembly comprising:
   a. a disc uniformly and securely mounted about said first shaft intermediate said ferromagnetic follower and said reflecting member;
   b. a ferromagnetic member secured to said disc along the circumference thereof;
   c. a pair of magnetic solenoids, said magnetic solenoids being disposed about the circumference of said disc in the vicinity of said ferromagnetic member, each of said magnetic solenoids having a current carrying winding wound thereabout, whereby said first shaft will rotate upon the energizing of one of said magnetic solenoids; and
   d. means for alternately energizing said magnetic solenoids coupled to said windings.

4. A continuous film feed motion picture apparatus as defined in claim 2 further including a retrace assembly comprising:
   a. a disc uniformly and securely mounted about said first shaft intermediate said ferromagnetic follower and said reflecting member;
   b. permanent magnetic members secured to said disc along the circumference thereof, said permanent magnetic followers having opposed magnetic poles;
   c. a pair of magnetic solenoids, said magnetic solenoids being disposed about the circumference of said disc in the vicinitiy of said permanent magnetic members, each of said magnetic solenoids having a current carrying winding wound thereabout; and
   d. means for alternately energizing said solenoids whereby said permanent magnetic members are alternately attracted to or repelled from the respective ones of said energized magnetic solenoids whereby said first shaft will rotate upon the energizing of said magnetic solenoids.

5. A continuous film feed motion picture apparatus as defined in claim 2 wherein said film feed means comprises a source of continuous velocity, rotary power and a pair of circular members coupled in parallel spaced relation to each other and axially coupled to said rotating means about said first shaft and said reflecting member, one of said discs having a plurality of sprockets disposed in uniform spaced relation about the circumference thereof, and further including a pair of optical lenses each having a focal length equal to one-half the distance between the axis of said first shaft and the circumference of said circular member, said lenses being mounted perpendicular to each other and intermediate said first shaft and the circumference of said circular member, the optical axis of said lenses intersecting the axis of said first shaft at said reflecting member.

6. A continuous film feed motion picture apparatus comprising:
  a. a light source;
  b. film feed means for moving the film strip through said apparatus at a predetermined, constant velocity;
  c. an arcuate film gate including a pair of parallel spaced members adapted to engage the transverse edges of the film strip;
  d. a first shaft being disposed through the center of a circle whose circumference includes said arcuate film gate;
  e. a reflecting member aligned with said film gate and said light source whereby light transmitted through the film strip is reflected from said reflecting member, said reflecting member being mounted upon said first shaft at the pivoting axis of said reflecting member;
  f. rotating means for rotating at an angular velocity proportional to the angular velocity of the film strip over said arcuate film gate, said rotating means comprising:
    i. a direct current power source;
    ii. a plurality of ferromagnetic core pieces each having a pair of termini, said core pieces in cylindrical alignment with each other and coupled to said film feed means, each core piece having its pair of termini in diametrically opposed positions, each core piece being uniformly spaced from the adjacent core piece and defining an interior, axial cavity;
    iii. a pair of concentric, metallized commutator tracks disposed about the axis of said core pieces and in an integral, fixed relationship with said core pieces;
    iv. first and second means for coupling electrical current to alternate ones of said core pieces, whereby alternate ones of said core pieces will be energized and a magnetic field created, each of said first and second means being coupled to respective ones of said commutator tracks;
    v. switching means for coupling said direct current power source to alternate ones of said core pieces through said first and second means, said switching means being coupled to said commutator tracks and said power source; and
  g. oscillating means for oscillating said first shaft about the axis thereof and imparting reciprocating rotational motion to said reflecting member, said oscillating means being coupled intermediate said first shaft and said rotating means.

7. A continuous film feed motion picture apparatus as defined in claim 6 wherein said oscillating means comprises a ferromagnetic follower having a plurality of uniformly separated, radially depending arms equal in number to one-half the number of core pieces, said ferromagnetic follower mounted upon the end of said first shaft in axial opposition to said reflecting member, said ferromagnetic follower being suspended between the termini of said core pieces within the said interior, axial cavity.

8. A continuous film feed motion picture apparatus as defined in claim 7 further including a retrace assembly comprising:
  a. a disc uniformly and securely mounted about said first shaft intermediate said ferromagnetic follower and said reflecting member;
  b. a ferromagnetic member secured to said disc along the circumference thereof;
  c. a pair of adjacent magnetic solenoids, said magnetic solenoids being disposed about the circumference of said disc in the vicinity of said ferromagnetic member, each of said magnetic solenoids having a current carrying winding wound thereabout whereby said first shaft will rotate upon the energizing of one of said magnetic solenoids; and
  d. means for alternately energizing said magnetic solenoids coupled to said windings.

9. A continuous film feed motion picture apparatus as defined in claim 7 further including a retrace assembly comprising:
  a. a disc uniformly and securely mounted about said first shaft intermediate said ferromagnetic follower and said reflecting member;
  b. a permanent magnetic member secured to said disc along the circumference thereof, said permanent magnetic member having a north and sourth magnetic pole along the circumference of said disc;
  c. a pair of adjacent magnetic solenoids, said magnetic solenoids being disposed about the circumference of said disc in the vicinity of said permanent magnetic member, each of said magnetic solenoids having a current carying winding disposed thereabout; and
  d. means for alternately energizing the magnetic solenoids coupled to said windings whereby said permanent magnetic member is alternately attracted to or repelled from the respective one of said energized magnetic solenoids causing said first shaft to rotate upon the energizing of said magnetic solenoids.

* * * * *